United States Patent Office
2,944,059
Patented July 5, 1960

2,944,059
SYNTHESIS OF PYRIDINOLS AND INTERMEDIATE

Niels Elming, Vermlandsgade 2, 4, Copenhagen S, Denmark, and Niels Konrad Friedrich Wilhelm Clauson-Kaas, Disraeli St. 13, Haifa, Israel No Drawing. Filed May 24, 1956, Ser. No. 586,919

2 Claims. (Cl. 260—297)

This invention relates to the synthesis of pyridinols and more particularly to an improved process for preparing 6-methyl-3-pyridinol and 6-hydroxymethyl-3-pyridinol.

The objects of this invention are: (1) the provision of an improved process for preparing the known compounds, 6-methyl-3-pyridinol and 6-hydroxymethyl-3-pyridinol, in high yield and substantially pure state, and (2) the preparation of new intermediates useful in the synthesis thereof.

The process of this invention essentially comprises reductively aminating 5-hydroxymethyl-furfural to one of the new intermediates of this invention, 5-hydroxymethyl-furfurylamine, by treatment of the former with ammonia and hydrogen in the presence of a hydrogenation catalyst, and then either treating the latter with an aqueous acid to form 6-methyl-3-pyridinol or acylating the 5-hydroxymethyl-furfurylamine to the diacyl derivative, dimethoxylating this derivative to its 2,5-dimethoxy derivative, and saponifying to obtain 6-hydroxymethyl-3-pyridinol.

Both 6-hydroxymethyl-3-pyridinol and 6-methyl-3-pyridinol are known compounds, with disclosed utility as intermediates in the preparation of physiologically active final products. Thus, 6-methyl-3-pyridinol, for example, can be converted to parasympathomimetically active N-benzyl-3-dimethylcarbamyloxy-6-methylpyridinium bromide by the method disclosed by Wuest and Sakal [J. Am. Chem. Soc., 73, 1210–16 (1952)].

The new intermediates of this invention can be represented by the general formula

wherein R and R' are the same or different and represent hydrogen or acyl, preferably an acyl radical of a hydrocarbon carboxylic acid of less than ten carbon atoms as exemplified by the lower alkanoic acids (e.g., acetyl and propionyl), the monocyclic aromatic carboxylic acids (e.g., benzoyl and toloyl), and the monocyclic aralkanoic acids (e.g., phenacetyl and β-phenylpropionyl).

To prepare the intermediates of this invention 5-hydroxymethylfurfural is interacted with ammonia and hydrogen in the presence of a hydrogenation catalyst, such as a pyrophoric nickel (e.g., Raney nickel), although other metallic hydrogenation catalyst may be used. The reaction is preferably conducted under substantially anhydrous conditions by employing liquid ammonia in an inert organic solvent (e.g., a lower alkanol, such as methanol). In order to increase the yield and decrease the time of reaction, the reductive amination is optimally conducted at an elevated temperature (e.g., in the range of about 50° C. to about 80° C.) under a superatmospheric pressure of hydrogen.

The 5-hydroxymethyl-furfurylamine, thus formed, can then be acylated in the usual manner, as by treating with the desired acyl halide or acid anhydride in the presence of an organic base (e.g., pyridine) to yield the mono or diacylated derivative. Thus, if at least two moles of acid anhydride (e.g., acetic anhydride) is employed per mole of the furfurylamine, a 2,5-diacylate (e.g., 2,5-diacetate) is formed.

The 2-acylamidomethyl-5-acyloxymethyl-furan (e.g., 2-acetamidomethyl-5-acetoxymethyl-furan) thus formed can then be converted to 6-hydroxymethyl-3-pyridinol by the general method disclosed by Clauson-Kaas and Limborg in U.S. Patent No. 2,714,576, granted August 2, 1955, by electrolysis in methanol and subsequent treatment with an aqueous base and/or acid.

Alternatively, the 5-hydroxymethyl-furfurylamine can be hydrolyzed to 6-methyl-3-pyridinol by treatment with dilute aqueous acid, preferably a dilute aqueous solution of a mineral acid, such as hydrochloric acid, to give the desired 6-methyl-3-pyridinol in high yield (i.e., yields above 85%).

The following examples illustrate the invention (all temperatures being in centigrade):

EXAMPLE 1

5-hydroxymethyl-furfurylamine 12.8 g. of 5-hydroxymethylfurfural (Haworth et al., J. Chem. Soc., 1944, 667), 30 ml. of methanol, 5 ml. of liquid ammonia, and 0.4 g. of Raney nickel are mixed and shaken for one hour under 100 atmospheres of hydrogen at 65–75°. After cooling, the reaction mixture is filtered and the filtrate distilled. The yield is about 9.30 g. (72%) of 5-hydroxymethyl-furfurylamine (pale yellow liquid, B.P. under 0.1 mm. of mercury about 102–105°, $n_D^{25}$ 1.5278).

Analysis.—Calcd. for $C_6H_9O_2N$ (127.1): C, 56.7; H, 7.1; N, 11.0. Found: C, 56.8; H, 7.4; N, 11.1.

EXAMPLE 2

2-acetamidomethyl-5-acetoxymethyl-furan 1.27 g. of 5-hydroxymethyl-furfurylamine is dissolved in a mixture of 15 ml. of acetic anhydride and 15 ml. of pyridine. The reaction mixture is left standing for two days and then evaporated in vacuo. The residue is crystallized from ether to yield about 1.93 g. (92%) of 2-acetamidomethyl-5-acetoxymethyl-furan (white crystals, M.P. about 65–67°).

Analysis.—Calcd. for $C_6H_7O_2N(COCH_3)_2$ (211.2): C, 56.9; H, 6.2; N, 6.6; $COCH_3$, 40.8. Found: C, 56.9; H, 6.2; N, 6.3; $COCH_3$, 38.5.

EXAMPLE 3

6-hydroxymethyl-3-pyridinol 1.70 g. (0.0080 mole) of 2-acetamidomethyl-5-acetoxymethyl-furan and 200 mg. of ammonium bromide are dissolved in 15 ml. of methanol and the solution is electrolyzed with the set-up described in U.S. Patent No. 2,714,576 at a temperature of −21°. The electrolysis is conducted for two hours at a current of 0.22–0.30 amperes and a potential of 4.6–5.1 volts. After electrolysis, the liquid is poured into a solution of sodium methoxide (from 250 ml. of sodium) in 5 ml. of methanol and the methanol and ammonia evaporated in a vacuum. 14 ml. of 3 N sodium hydroxide is added and the mixture is heated under reflux for 18 hours and then continuously extracted with ether. The ether is evaporated in a vacuum and the remaining mixture heated for 20 minutes under reflux with 15 ml. of N hydrochloric acid. The mixture is evaporated to dryness in a vacuum and the residue then dissolved in 15 ml. of water. Solid potassium carbonate is added and the mixture continuously extracted with ether. The ether extract is evaporated, the residue washed twice with ether and dried. The yield is about 0.74 g. (74%) of 6-hydroxymethyl-3-pyridinol (light brown crystals, M.P. about 123–125°). It gives a red color with aqueous ferric chloride.

*Analysis.*—Calcd. for $C_6H_7O_2N$ (125.1): C, 57.6; H, 5.6; N, 11.2. Found: C, 57.6; H, 5.8; N, 10.8.

Sublimation (125°, 0.05 mm. mercury) gives white crystals, M.P. about 123–125°.

EXAMPLE 4

*6-methyl-3-pyridinol*

1.27 g. of 5-hydroxymethyl-furfurylamine is dissolved in a mixture of 60 ml. of hydrochloric acid and 40 ml. of water. The reaction mixture is heated for 15 hours under reflux and then evaporated in a vacuum. The residue is dissolved in 15 ml. of water, solid potassium carbonate is added and the mixture continuously extracted with ether. The ether extract is evaporated, the residue washed twice with ether and dried. The yield is about 0.96 g. (88%) of 6-methyl-3-pyridinol (light brown crystals, M.P. about 168–170°). It gives a red color with aqueous ferric chloride.

*Analysis.*—Calcd. for $C_6H_7ON$ (109.1): C, 66.0; H, 6.5; N, 12.8. Found: C, 66.0; H, 6.5; N, 12.7.

Sublimation (150°, 0.05 mm. mercury) gives white crystals, M.P. about 169–171°.

The invention may be otherwise variously embodied within the scope of the appended claims.

We claim:
1. 2-acetamidomethyl-5-acetoxymethyl-furan.
2. A process for preparing 6-methyl-3-pyridinol, which comprises heating 5-hydroxymethyl-furfurylamine with a dilute aqueous acid and recovering the 6-methyl-3-pyridinol produced.

References Cited in the file of this patent

UNITED STATES PATENTS

| | | |
|---|---|---|
| 2,045,574 | Adkins | June 30, 1936 |
| 2,109,159 | Winans | Feb. 22, 1938 |
| 2,191,029 | McNally et al. | Feb. 20, 1940 |
| 2,191,030 | McNally et al. | Feb. 20, 1940 |
| 2,636,882 | Dunlop et al. | Apr. 28, 1953 |
| 2,672,461 | Dunlop et al. | Mar. 16, 1954 |
| 2,732,379 | Webb | Jan. 24, 1956 |
| 2,734,063 | Stevens | Feb. 7, 1956 |